United States Patent Office 3,362,944
Patented Jan. 9, 1968

3,362,944
TACTICITY CONTROL IN SOLUTION
POLYMERIZATION
Raymond Eichenbaum and Ralph E. Ringelman, Spotswood, and William C. L. Wu, Highland Park, N.J., assignors to Mobil Oil Corporation, a corporation of New York
No Drawing. Continuation of application Ser. No. 375,370, June 15, 1954. This application Apr. 13, 1967, Ser. No. 630,772
5 Claims. (Cl. 260—93.7)

ABSTRACT OF THE DISCLOSURE

In the stereospecific polymerization of $C_4$–$C_{10}$ 1-olefins in solution in liquid monomer, tacticity is controlled by adding to the 1-olefin 0.05 percent to 0.5 percent, by weight of 1-olefin, of ethylene or propylene. Ethylene decreases tacticity and propylene increases tacticity.

---

This application is a continuation of copending application Ser. No. 375,370, filed June 15, 1964, and now abandoned.

This invention relates to the stereospecific polymerization of butene-1 and higher 1-olefins. It is more particularly concerned with the control of the degree of tacticity of a stereoregular polymer produced by stereospecific polymerization of butene-1 and higher 1-olefins.

As is well known to those familiar with the art, highly tactic polymers of 1-olefins have been prepared in the presence of catalyst systems comprising (A) a compound of a transitional metal of roups IV–A, V–A, VI–A, and VIII of the Periodic Arrangement of the Elements, wherein the metal is present in a valence state lower than its maximum, and (B) at least one organometallic compound of metals of Groups II and III of the Periodic Arrangement of the Elements. Generally, the polymerization reaction involved has been carried out in the presence of inert diluents, such as paraffinic and aromatic hydrocarbons and hydrocarbon fractions containing them.

In copending application Ser. No. 375,061, filed June 15, 1964, and now abandoned, there is disclosed an improved process for the stereospecific polymerization of butene-1 and higher 1-olefins which is carried out in the presence of excess liquid monomer. The conditions are controlled to maintain the polymer formed in solution in its liquid monomer. In this process, the polymer product is produced in high yield and has a high molecular weight and degree of tacticity. In order to be commercially feasible, however, a polymerization process should be capable of producing polymers of varying degrees of tacticity for various specific end uses. To some extent, such variations can be effected by varying process conditions, or by varying the catalyst components or the ratio thereof. As is well known, process or catalyst variations are accompanied by undesirable decrease in molecular weight and in yield. If, however, the degree of tacticity can be varied without changing the operating conditions or the catalyst system, yields and molecular weight should remain substantially the same.

It is the discovery of this invention that the degree of tacticity of a polymer of butene-1 and higher 1-olefins can be varied without changing process conditions or the catalyst system. Such variation of tacticity is effected by adding to the 1-olefin charge to the polymerization reaction a very minor amount of ethylene or propylene. The addition of ethylene decreases tacticity and addition of propylene increases tacticity. The amount of ethylene or propylene added, less than one weight percent of the feed, is far less than the amount of comonomer used to make polyolefin copolymers.

Through the specification and claims, the term "tactic" is a generic term applied to solid polymers in which there is an ordered structure with respect to the configurations around at least one main-chain site of steric isomerism per conventional base unit. Numerous types of tacticity are recognized in the art. Within the contemplation of this invention, a measure of steric order, i.e., Isotactic Index (I.I.), is the weight percent of the solid polymer that is insoluble in diethyl ether. A linear polymer that is insoluble in diethyl ether is considered to be tactic. Linear tactic polymers may be composed of isotactic or syndiotactic chains, blocks, or mixtures of these forms. The terms isotactic and syndiotactic are used in accordance with the definitions tentatively approved by commission on Macromolecules of the International Union of Pure and Applied Chemistry, as outlined in the Journal of Polymer Science, volume 56, pages 153–161 (1962). Tactic polymers can contain sequences of atactic (i.e., not tactic) units in conjunction with tactic sequences and still be insoluble in diethyl ether. They are tactic polymers within the contemplation of this invention.

It is a broad object of this invention to provide a method for controlling the degree of tacticity of polymers of butene-1 or higher 1-olefins. Another object is to provide a method for varying the degree of tacticity of a polymer of butene-1 or higher 1-olefins without changing reaction conditions or the catalyst system. A specific object is to provide a means for controlling the degree of tacticity of a polymer of butene-1 or higher 1-olefin without changing the catalyst system or reaction conditions, preferably in a process wherein liquid monomer is used as a solvent under conditions wherein tactic polymer product is maintained in solution in liquid monomer. Other objects and advantages of this invention will become apparent to those skilled in the art from the following detailed description.

In general, this invention provides, in the method for producing a tactic polymer of butene-1 and higher 1-olefins, by contacting, in the liquid phase, a 1-olefin monomer having 4 to 10 carbon atoms with a catalyst system comprising (A) a compound of a transitional metal of Groups IV–A, V–A, VI–A, and VIII of the Periodic Arrangement of the Elements wherein the metal is present in a valence state lower than its maximum and (B) at least one organometallic compound of metals of Groups II and III of the Periodic Arrangement of the Elements, the improvement wherein there is added to the 1-olefin monomer a small amount, sufficient to modify the tacticity of the polymer, of either ethylene to reduce tacticity, or propylene to increase tacticity.

The 1-olefin monomer that is polymerized with varied degree of tacticity in accordance with the process of this invention is a 1-olefin having between 4 and 10 carbon atoms, inclusive. It has the structure, $CH_2\!=\!CHR$, wherein R is an alkyl radical having between 2 and 8 carbon atoms. Non-limiting examples of the 1-olefin reactant include butene-1; pentene-1; 3-methylbutene-1; hexene-1; 3-methylpentene-1; 4-methylpentene-1; heptene-1; 4-methylhexene-1; octene-1; nonene-1; and decene-1. Preferably, the 1-olefin should be substantially pure. Also, the 1-olefin should be dry and oxygen free.

The catalyst system utilized in making the polymers modified in accordance with this invention is composed of at least two components, one being a compound of a transitional metal of Groups IV–A, V–A, VI–A and VIII of the Periodic Arrangement of the Elements in a reduced valence state, and the other being an organometallic compound of a metal of Groups II and III of the Periodic Arrangement of the Elements. The Periodic Arrangement of the Elements, as referred to herein, is that published in the Journal of Chemical Education, volume 16, page 409 (1939).

Among the reducible transitional metal compounds suitable for the purposes of this invention are the heavy metal, inorganic compounds such as halides, oxyhalides, complex halides, hydroxides; and organic compounds such as alcoholates, acetates, benzoates, and acetyl acetonates, of the metals of Groups IV-A, V-A, VI-A, and VIII of the Periodic Arrangement of the Elements. Such metals include titanium, zirconium, hafnium, thorium, uranium, vanadium, nobium, tantalum, chromium, molybdenum, tungsten and iron. The metal halides, particularly the chlorides, are generally preferred. Titanium, zirconium, and vanadium are the most active metals. The following heavy metal compounds are readily reducible: titanium tetrachloride, titanium tetrabromide, zirconium tetrachloride, vanadium tetrachloride, and zirconium acetylacetonate.

These transitional metal compounds can be reduced to valence states lower than maximum valence by a number of ways well known in the art. As exemplified by titanium tetrachloride, it can be reduced to titanium trichloride and/or dichloride by hydrogen to a brown amorphous substance, which is converted into the violet crystalline form by heating at an elevated temperature in the order of 200° C. The reduction can also be accomplished by heating titanium tetrachloride with metallic titanium or aluminum under pressure. This reduction can be promoted by Friedel-Crafts halides. In the case of the aluminum reduction, the product will comprise reduced titanium chloride and aluminum trichloride. The reduction can also be effected by an organometallic compound of Group II or III to produce a crystalline titanium halide in a valence state lower than maximum. Suitable materials for this reduction are trialkyl aluminum and dialkyl aluminum halides. In practicing the present invention, the particular method of obtaining the transitional metal compound of reduced valence state is not pertinent. Indeed, many reduced compounds contemplated herein are commercially available.

The other component of the catalyst system is at least one organometallic compound of a metal of Groups II and III. These compounds will have at least one hydrocarbon radical, i.e., alkyl, cycloalkyl, aralkyl, alkaryl, or aryl, attached to the metal through a carbon atom. The other substituents in the organometallic compound can be hydrocarbon radicals, halogen radicals, alkoxy, amino, hydrogen, etc., or combinations thereof. Non-limiting examples of the organometallic compounds are triethylaluminum, tripropylaluminum, dipropylzinc, triisobutylaluminum, diethylmagnesium, diphenylaluminum chloride, cyclohexylethylzinc, diethylaluminum bromide, diethylaluminum chloride, diethylaluminum iodide, ethylzinc chloride, propylmagnesium chloride, dipropylaluminum chloride, dioctylaluminum chloride, diisobutylaluminum hydride, phenylaluminum dihydride, cyclohexylbromo aluminum hydride, dipropylaluminum hydride, propyl zinc hydride, ethylmagnesium hydride, and methoxyaluminum diethyl. Mixtures of two or more organometallic compounds can be used. A preferred mixture is diethylaluminum chloride and diethylaluminum iodide, usually in a ratio of about 80 mole percent chloride and 20 mole percent iodide.

If desired, minor amounts of a third component can be used with the catalyst system of reduced transitional metal compound and organometallic compound. Such materials are well known to those familiar with the art and include carbides, acetylides, organophosphorus compounds, and Lewis bases.

In activating the reduced transitional metal compound (e.g. $TiCl_3$) with an organometallic compound (e.g. diethylaluminum chloride) various ratios can be used. Thus, the molar ratio of these two components (e.g. Al/Ti) can range from 1 to 6 moles of organometallic compound per mole of reduced transitional metal compound. A ratio of about 3:1 to 4:1 is preferred.

The catalyst system of reduced transitional metal compound and organometallic compound can be formed in several ways known in the art. Particularly in batch operation, the catalyst can be formed by separately charging the catalyst components to the polymerization reaction zone, in the proper ratio, so that they are combined in the reaction zone or just prior to their entry therein. The reduced transitional metal compound is suitably charged as a slurry in liquid monomer. As the organometallic compound is usually liquid, a solvent need not be employed.

The stereospecific polymerization of 1-olefins, to which this invention is applicable, can be carried out in several ways. Ordinarily, it is carried out in the presence of inert hydrocarbon diluents. Suitable diluents include gasoline, paraffin oil, hexane, heptane, octanes benzene, and other hydrocarbons and mixtures thereof. Another way is to carry out the polymerization in the gaseous phase without diluent. A preferred method, to which this invention is particularly applicable is disclosed in copending application Ser. No. 357,061, filed June 15, 1964, and now abandoned.

In accordance with this preferred method, it is an important feature of the process in which tacticity of the polymer product is regulated in accordance with this invention that it is carried out using liquid 1-olefin monomer as a true solvent. Under the operating conditions of the process, the tactic poly-1-olefin product dissolves in the monomer.

As is well known in the art, the yield of tactic polymer is dependent in part upon the activity of the catalyst and varies with the catalyst system and the operating conditions. Such yield for a given catalyst and polymerization conditions is readily determinable by those skilled in the art. It is usually expressed as parts tactic polymer produced per part reducer transitional metal compound.

In order to maintain the solution of polymer in monomer, there must be present sufficient excess liquid monomer over that which can enter into the polymerization reaction. Generally, the concentration of tactic polymer in the liquid monomer should not exceed about 30 weight percent, because at higher concentrations efficient agitation and handling become extremely difficult. In preferred practice the concentration of tactic polymer in liquid monomer will be between about 12 weight percent and about 18 weight percent. In order to maintain a selected concentration of polymer in 1-olefin monomer, the ratio of monomer to catalyst can vary over a wide range dependent upon the catalyst activity and the reaction conditions employed. Accordingly, there can be charged to the reaction between about 400 parts 1-olefin and about 36,000 parts or more 1-olefin per part of reduced transitional metal compound; all parts being by weight.

A solution of a tactic polymer of butene-1 and higher 1-olefins in liquid 1-olefin monomer exhibits a phenomenon of having two cloud points. As the solution is cooled, a temperature will be reached at which polymer will precipitate. This temperature is called the lower cloud point. On the other hand, as the solution is heated a temperature will be reached at which there will form a polymer-rich phase and a polymer-lean phase. This temperature is called the upper cloud point. At temperatures between the two cloud points there will exist a homogeneous solution of polymer in monomer. Accordingly, the polymerization process must be operated at temperatures between the lower cloud point and the upper cloud point of the solution of tactic polymer in its liquid olefin monomer. The cloud points for a given poly-1-olefin in its liquid monomer can be readily determined by those skilled in the art by well-known methods. In the case of polybutene-1, the polymerization process will be operated at temperatures between about 110° F. and about 195° F. In preferred practice the process is operated at about 150° F.

As has been indicated hereinbefore, the polymerization process is preferably carried out in the liquid phase. Accordingly, depending upon the operating temperature, there must be employed sufficient pressure to maintain the 1-olefin in the liquid phase. For each 1-olefin, the required pressure at the operating temperature can be determined by means of vapor pressure-temperature relationship curves, such as by the Cox Chart Method [cf. Ind. Eng. Chem. 15 592 (1923)].

It will be desirable in many cases to control the molecular weight of the polymer product. A feasible method is to add minor amounts of hydrogen to the reaction to reduce molecular weight. The amount of hydrogen used can range from none up to about 0.1 mole percent, based upon 1-olefin charge. This generally corresponds to a hydrogen partial pressure of up to about 15 to 20 p.s.i.g.

In accordance with this invention, the tacticity of the polymer produced in the aforedescribed process is regulated by adding small amounts of ethylene or propylene to the 1-olefin charge, without changing process conditions or catalyst system. In the case wherein it is desired to increase tacticity, a small amount of propylene is added to the 1-olefin charge. On the other hand, when it is desired to decrease tacticity, ethylene is used. In each case, the amount of ethylene or propylene used is extremely small, i.e., one percent or less of the weight of the 1-olefin monomer charge. This amount is considerably less than the amount (usually 5 percent or more) used to prepare copolymers. Indeed, infrared analysis of polymers produced in accordance with this invention showed no evidence of copolymer structure. In general, the amount of ethylene or propylene used will be between about 0.05 percent and about one percent by weight of the 1-olefin charge, such as butene-1. Preferably, there will be used between about 0.05 and about 0.5 percent.

In general, the residence time of 1-olefin reactant and catalyst system in the polymerization reactor will be between about 0.5 hour and about 10 hours. Preferably it will be about 3 hours.

Upon completion of the polymerization reaction, the catalyst can be deactivated and substantially completely removed by aqueous washing of the solution of polymer in liquid monomer. The polymer is maintained in solution within the ranges of temperature and pressure used in the reactor, as set forth hereinbefore. Suitably, substantially the same temperature and pressure employed in the polymerization reaction can be used, although higher temperatures up to the upper cloud point and correspondingly higher pressure can be used. In practice, the wash water is demineralized and oxygenated (to avoid oxidation of catalyst). If desired, acidic compounds, basic compounds, or chelating agents can be added thereto. The reduced transitional metal compound and decomposition products of the organometallic compounds will remain virtually completely with the aqueous phase. The amount of aqueous wash employed can vary between about 0.01 volume and about one volume per volume polymer solution. Usually about 0.6 volume is preferred.

If it is desired, the washed polymer solution can be treated by contact with absorbents, such as alumina. Such treatment serves to dry the polymer solution and to remove residual traces of catalyst residues and of acidic catalyst decomposition products. In the usual practice of the process of this invention, however, such treatment is not necessary, because satisfactory catalyst removal is ordinarily effected by aqueous washing alone.

After catalyst components have been removed, the tactic polymer product is separated. This can be done in several ways. In one procedure, the pressure is reduced and the 1-olefin monomer is flashed off or distilled out, leaving the tactic polymer. This procedure, however, would involve handling relatively large quantities of monomer. Another method would involve maintaining liquid phase and cooling the solution of polymer to precipitate the polymer therefrom. It can then be separated by filtration.

A particularly feasible method for separating the polymer product is the claimed subject matter of a copending application Ser. No. 375,287, filed concurrently herewith.

As has been mentioned hereinbefore, the solution of the polymer in its liquid monomer exhibits two cloud points. Thus, the solution is heated to a temperature above the upper cloud point, with a corresponding increase in pressure sufficient to maintain liquid phase. In order to obtain the benefit of decreased viscosity and the resultant ease in handling, it is desirable to use as high a temperature as possible. This can be any temperature above the upper cloud point and up to the critical temperature of the 1-olefin solvent. In the case of butene-1, therefore, the solution of polybutene-1 in liquid butene-1 is heated to a temperature between about 195° F. and about 294° F. A suitable temperature is about 260° F.

When the solution of polymer in its monomer is heated above the upper cloud point, as aforedescribed, there occurs a separation into two distinct liquid phases. The lighter phase is a polymer-lean phase which comprises liquid 1-olefin containing small amounts of polymer. The amount of polymer in the polymer-lean phase usually is less than one percent. It is largely composed of atactic polymer and low molecular weight tactic polymer.

The heavier phase is a polymer-rich phase, i.e. liquid monomer containing polymer in large amounts. In the case of butene-1, the concentration of polybutene-1 in liquid butene-1 in the polymer-rich phase will be in the order of about 50 weight percent. This phase can be readily separated and treated to recover the polymer product. Feasibly, this can be done by flashing off or distilling out the 1-olefin monomer. Another modification is to heat the separated polymer-rich phase to a temperature above the critical temperature of the monomer and to flash off the monomer, thus obtaining molten polymer product. This molten product can be fed directly to a hot melt extruder.

The polymer-lean phase will contain small amounts of water and possibly minor amounts of water-soluble decomposition products of the catalyst. This phase can be treated in various ways to recover pure 1-olefin monomer for recycling to the polymerization. For example, the polymer-lean phase can be cooled to a temperature approaching ambient temperature, being maintained under pressure sufficient to maintain liquid phase. This cooled phase can be water-washed to remove residual catalyst decomposition products and dried by contact with a suitable solid drying agent. Then, the 1-olefin monomer can be flashed or distilled off to recover reuseable, pure 1-olefin.

*Example 1*

A batch autoclave run was made to polymerize butene-1 using liquid butene-1 as the solvent. There were charged to the autoclave 1425 g. butene-1 and $5.02 \times 10^{-2}$ mole percent of hydrogen. The catalyst was 0.3 g. titanium trichloride with diethylaluminum chloride, in an aluminum to titanium molar ratio of 2. The polymerization reaction was carried out for 60 min. at 150° F. Pertinent results of this run, i.e., activity (g. polymer/g. TiCl$_3$), Isotactic Index (I.I.=% insoluble in diethyl ether), and Reduced Specific Viscosity (RSV), are set forth in the table.

*Examples 2 through 4*

Three runs were carried out as described in Example 1, except that varying amounts of propylene were added to the butene-1 charge in each run. Pertinent data are set forth in the table.

TABLE

| Example | Wt. percent added Propylene | Activity | I.I. | RSV |
|---|---|---|---|---|
| 1 | [1] None | 395 | 84.6 | 1.74 |
| 2 | 0.1 | 339 | 88.6 | 2.15 |
| 3 | 0.15 | 184 | 91.2 | 1.93 |
| 4 | 0.77 | 389 | 86.7 | 1.69 |

[1] Butene-1 contained 34 p.p.m. propylene.

Examples 5 and 6

Two butene-1 polymerization runs were carried out in a continuous unit described in copending application Ser. No. 375,061. In each run, the butene-1 was charged at the rate of 30 pounds per hour. The catalyst charge rate was 1.33 g. titanium trichloride and 8.8 ml. diethylaluminum chloride per hour. Hydrogen was charged at the rate of 3.67 s.c.f. per hr. The polymerization was carried out at 150° F. under a pressure of 120 p.s.i.g. In one run, wherein the butene-1 charged contained 0.02 weight percent ethylene, the I.I. of the polybutene-1 product was 93. In the other run, the butene-1 charged contained 0.09 weight percent ethylene. The polybutene-1 produced had an I.I. of 70.

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. In the method for producing a tactic polymer of butene-1 and higher 1-olefins by contacting a 1-olefin monomer having 4 to 10 carbon atoms with a catalyst system comprising a component A, a compound of a transitional metal of Groups IV-A, V-A, VI-A, VIII of the Periodic Arrangement of the Elements wherein the metal is present in a valence state lower than its maximum, and at least one component B, organometallic compound of metals of Groups II and III of the Periodic Arrangement of the Elements; the improvement wherein there is added to the 1-olefin monomer between about 0.05 percent and about 0.5 percent, by weight of the 1-olefin charge, of a light olefin selected from the group consisting of ethylene, in the case of reducing tacticity, and propylene, in the case of increasing tacticity.

2. In the method for producing a tactic polymer of butene-1 and higher 1-olefins by contacting, in the liquid phase, a 1-olefin monomer having 4 to 10 carbon atoms with a catalyst system comprising a component A, a compound of a transitional metal of Groups IV-A, V-A, VI-A, and VIII of the Periodic Arrangement of the Elements wherein the metal is present in a valence state lower than its maximum, and at least one component B, organometallic compound of metals of Groups II and III of the Periodic Arrangement of the Elements, wherein said tactic polymer is produced in solution in its liquid 1-olefin monomer; the improvement wherein there is added to the 1-olefin monomer between about 0.05 percent and about 0.5 percent, by weight of the 1-olefin charge, of a light olefin selected from the group consisting of ethylene, in the case of reducing tacticity, and propylene, in the case of increasing tacticity.

3. The method of claim 2, wherein said component A is a titanium halide, and said component B is an aluminum alkyl.

4. In the method for producing tactic polybutene-1 by contacting, in the liquid phase, butene-1 with a catalyst system comprising titanium trichloride and diethylaluminum chloride, wherein said tactic polybutene-1 is produced in solution in liquid butene-1; the improvement wherein there is added to the butene-1 between about 0.05 percent and about 0.5 percent of ethylene by weight of the butene-1 charge.

5. In the method for producing tactic polybutene-1 by contacting, in the liquid phase, butene-1 with a catalyst system comprising titanium trichloride and diethylaluminum chloride, wherein said tactic polybutene-1 is produced in solution in liquid butene-1; the improvement wherein there is added to the butene-1 between about 0.05 percent and about 0.5 percent of propylene by weight of the butene-1 charge.

References Cited
UNITED STATES PATENTS 3,029,231   4/1962   Amerongen _____ 260—94.9

JOSEPH L. SCHOFER, *Primary Examiner.*

F. L. DENSON, M. B. KURTZMAN,
*Assistant Examiners.*